(12) United States Patent
Okamoto et al.

(10) Patent No.: US 8,945,669 B2
(45) Date of Patent: Feb. 3, 2015

(54) EXTRUSION MATERIAL SUPPLY DEVICE AND OPTICAL TRANSMISSION BODY MANUFACTURING METHOD USING THE SAME

(75) Inventors: Tazuru Okamoto, Kyoto (JP); Hirotsugu Yoshida, Kyoto (JP); Yasuhiro Koike, Yokohama (JP)

(73) Assignees: Sekisui Chemical Co., Ltd., Osaka (JP); Keio University, Tokyo (JP)

( * ) Notice: Subject to any disclaimer, the term of this patent is extended or adjusted under 35 U.S.C. 154(b) by 709 days.

(21) Appl. No.: 13/258,182

(22) PCT Filed: Jan. 26, 2010

(86) PCT No.: PCT/JP2010/050935
§ 371 (c)(1),
(2), (4) Date: Sep. 21, 2011

(87) PCT Pub. No.: WO2010/109938
PCT Pub. Date: Sep. 30, 2010

(65) Prior Publication Data
US 2012/0034374 A1     Feb. 9, 2012

(30) Foreign Application Priority Data
Mar. 23, 2009 (JP) ................................ 2009-069568

(51) Int. Cl.
*B05D 5/06* (2006.01)
*B29C 47/54* (2006.01)
(Continued)

(52) U.S. Cl.
CPC ............. *B29C 47/54* (2013.01); *B29C 47/0016* (2013.01); *B29C 47/92* (2013.01);
(Continued)

(58) Field of Classification Search
CPC ................... B05D 1/265; B05D 5/06; B29C 47/00–47/28; G02B 6/02–6/03694
USPC .......... 427/163.2; 264/1.1, 1.24, 1.29; 118/50
See application file for complete search history.

(56) References Cited

U.S. PATENT DOCUMENTS 4,161,500 A * 7/1979 Schleinitz et al. ........... 264/1.29
5,061,170 A * 10/1991 Allen et al. ................... 425/197
(Continued)

FOREIGN PATENT DOCUMENTS

| CN | 1053032 A | 7/1991 |
|---|---|---|
| JP | 52-9065 A | 1/1977 |
| JP | 60-73813 A | 4/1985 |

OTHER PUBLICATIONS

International Search Report for the Application No. PCT/JP2010/050935 mailed Apr. 13, 2010.
(Continued)

*Primary Examiner* — Elizabeth Burkhart
(74) *Attorney, Agent, or Firm* — Cheng Law Group, PLLC

(57) ABSTRACT

The invention provides an extrusion material supply device suitable for use in melt extrusion molding, and a method for manufacturing an optical transmission body, in which a deterioration of an optical signal transmission loss is extremely small, and productivity intrinsic to an extrusion molding method is provided in combination. An extrusion material supply device 1 includes: a vertical hopper 2, which has a cooling unit 3 and a heat melting unit 4 continuous with a lower portion thereof, and houses a material rod R; cooling means 5 for cooling the cooling unit 3; an electric heater 6 that heats the heat melting unit 4; and gas pressurizing means 7 for sequentially supplying molten plastics M to a metal die by a gas pressure. The heat melting unit 4 is formed into a cylinder shape in which an inner diameter is larger than an inner diameter of the cooling unit 3 arranged above, and enables the molten plastics M to spread in the heat melting unit 4. A portion between an outer circumference of the material rod R and an outer circumference of the molten plastics M is defined as an annular gas pressurizing surface 7a.

18 Claims, 12 Drawing Sheets

(51) Int. Cl.
| | |
|---|---|
| *B29C 47/00* | (2006.01) |
| *B29C 47/92* | (2006.01) |
| *B29C 47/56* | (2006.01) |
| *B29C 47/38* | (2006.01) |
| *B29C 47/06* | (2006.01) |
| *B29C 47/28* | (2006.01) |
| *B29K 31/00* | (2006.01) |
| *B29K 33/00* | (2006.01) |
| *B29L 11/00* | (2006.01) |
| *G02B 6/02* | (2006.01) |

(52) U.S. Cl.
CPC ............... *B29C 47/56* (2013.01); *B29C 47/38* (2013.01); *B29C 47/0014* (2013.01); *B29C 47/06* (2013.01); *B29C 47/28* (2013.01); *B29C 2947/92019* (2013.01); *B29C 2947/92209* (2013.01); *B29C 2947/9238* (2013.01); *B29C 2947/926* (2013.01); *B29C 2947/92885* (2013.01); *B29K 2031/00* (2013.01); *B29K 2033/08* (2013.01); *B29K 2033/12* (2013.01); *B29K 2869/00* (2013.01); *B29L 2011/0075* (2013.01); *G02B 6/02038* (2013.01)
USPC ....... 427/163.2; 264/1.1; 264/1.24; 264/1.29; 137/334; 118/50

(56) References Cited

U.S. PATENT DOCUMENTS

| | | |
|---|---|---|
| 6,527,986 B2 | 3/2003 | Blyler, Jr. et al. |
| 2002/0105102 A1* | 8/2002 | Blyler et al. ................ 264/1.29 |

OTHER PUBLICATIONS

The First Office Action for the Application No. 201080013254.7 from The State Intellectual Property Office of the People's Republic of China dated Aug. 12, 2013.

* cited by examiner (a)

(b)

EXTRUSION MATERIAL SUPPLY DEVICE AND OPTICAL TRANSMISSION BODY MANUFACTURING METHOD USING THE SAME

TECHNICAL FIELD

The present invention relates to an extrusion material supply device and a method for manufacturing an optical transmission body for optical use, for use as an optical fiber, and the like. More specifically, the present invention relates to an extrusion material supply device suitable for manufacturing an optical transmission body obtained by melt extrusion molding, in which mainly a deterioration of an optical signal transmission loss is small in this manufacturing process, and relates to a method for manufacturing an optical transmission body, the method using the extrusion material supply device.

BACKGROUND ART

As typical manufacturing techniques for an optical transmission body (for example, an optical fiber), there have been proposed: 1) a method of melting and drawing down a preform by an interface gel polymerization method; 2) a screw extrusion method; and 3) an extrusion method using a gas pressure (Patent Document 1).

For optical use and for use as the optical fiber, optical polymer/fiber excellent in transparency and optical transmittance are required. With regard to this optical transmittance, quality performance thereof is deteriorated by impurities/foreign objects contained in a polymer constituting the fiber. For example, the impurities mentioned herein include those caused by oxidation degradation of the polymer due to oxygen contained in air or an extrusion system, thermal degradation of the polymer due to heat given thereto beyond a pot life, and the like. Moreover, as the foreign objects, there are typically mentioned: organic matter such as fiber adhered to a surface of a supplied material; inorganic matter such as dust; human skin coming from a worker; and the like.

PRIOR ART DOCUMENT

Patent Document

Patent Document 1: U.S. Pat. No. 6,527,986

DISCLOSURE OF THE INVENTION

Problems to be Solved by the Invention

Among the conventional publicly known techniques, in 1) the melting and drawing down method, there is no room for allowing mixing of a material and foreign objects in the environment during polymerization, and moreover, a heated and molten portion is drawn down, and accordingly, an occurrence of the impurities is relatively suppressed. However, since such material configurations as a layer ratio and a polymer type themselves depend on a polymerized portion, a degree of freedom in manufacturing the same cannot help but being reduced. Therefore, there has been a problem that productivity must be sacrificed.

In 2) the screw extrusion method, similarly to the general extrusion technique, a number of materials are stacked into a number of layers by the number of extruders, a layer thickness thereof can be arbitrarily changed by a metal die and the like, and it is possible to enhance the degree of freedom in manufacture. However, there has been a problem that a loss of signal transmission, which is caused by foreign objects adhered to the materials and impurities generated by screw shearing and heat, cannot be suppressed from being increased.

Moreover, in 3) the method using the gas pressure described in Patent Document 1, the loss of the signal transmission, which is caused by the impurities generated by the screw shearing, can be suppressed from being increased. However, a heat melting unit has been a unit that entirely melts a plastic material, and therefore, it is necessary to heat and melt the plastic material for a long time (several hours to one week), and there has been a problem that this method cannot be applied to plastics which is not excellent in thermal stability.

As described above, it is the largest object to cope with both the problems of the optical signal transmission loss and the productivity.

In view of the above-mentioned actual circumstances of the conventional art, it is an object of the present invention to provide an extrusion material supply device suitable for use in the melt extrusion molding, and to provide a manufacturing method of an optical transmission body, in which the increase of the transmission loss of the optical signal is extremely small, and the productivity intrinsic to the extrusion molding method is also provided in combination.

Means for Solving the Problems

An extrusion material supply device according to the present invention is an extrusion material supply device that heat melts a rod-like plastic material and supplies the rod-like plastic material to a metal die, the extrusion material supply device including: a container in which the rod-like plastic material is housed; a heat melting unit that is provided on a downstream side of the container and heat melts a lower end portion of the rod-like plastic material; heating means for heating the heat melting unit; and gas pressurizing means for sequentially supplying molten plastics to the metal die by a gas pressure.

As the container, there may be used one in which an entirety is formed so as to correspond to a shape of the material rod (the container having approximately a length equal to the sum of a length of the material rod and a length of the heat melting unit, and having an inner diameter slightly larger than an outer diameter of the material rod; referred to as a "hopper" herein). Moreover, there may be used one in which only a lower end portion corresponds to the shape of the material rod (the entirety of the container has a diameter several times larger than that of the material rod, and the lower end portion of the container has an inner diameter slightly larger than an outer diameter of the material rod, and a length of the container is equal to the sum of the length of the material rod and a length of a container-built-in portion with a configuration of feeding the material rod downward; referred to as a "pressurizing tank" herein).

The "downstream side" of the container may be a downstream side in the container (the lower end portion of the container), or may be a downstream side outside the container (a portion attached onto the lower end portion of the container).

According to the extrusion material supply device of the present invention, a lower end portion of the rod-like plastic material (hereinafter, sometimes referred to as the "material rod") is heat molten, whereby only a necessary amount thereof can be molten. Accordingly, the time during which the plastic material is being molten is shortened, and the deterioration of the signal transmission loss due to degraded matter can be prevented also for plastics which are not excellent in thermal stability.

The gas pressure supplied by the gas pressurizing means is preferably 0.1 to 3 MPa, more preferably 0.5 to 2 MPa. When the gas pressure is less than 0.1 MPa, the plastic material cannot be extruded, and when the gas pressure exceeds 3 MPa, it is necessary to adopt a device with a pressure-resistant structure, and this is not preferable.

The gas is not particularly limited; however, inert gas such as nitrogen gas and argon gas is preferable since the inert gas does not degrade the plastic material in quality.

A cross-sectional shape of the plastic material and a cross-sectional shape of the inner circumference of the hopper are not particularly limited, and a circular shape and a polygonal shape may be used.

A shape of the inner circumferential surface of the heat melting unit is not particularly limited, and a cylinder shape and an inverse conical shape may be used. In the case of the cylinder shape, an area of a gas pressurizing surface of the molten plastics is constant, and accordingly, the plastics can be extruded with constant extrusion force (=gas pressure× pressurization area). Moreover, in the case of the inverse conical shape, even if a temperature on the downstream (metal die and the like) fluctuates, the extrusion force (=gas pressure×pressurization area) is changed in a direction of canceling a change of a flow rate of the plastics, and accordingly, it is easy to suppress variations of the extrusion amount.

In the case where the cross-sectional shape of the material rod is circular, a diameter thereof is not limited; however, it is preferably 20 to 60 mm. When the diameter is smaller than 20 mm, it is necessary to prepare a long-scale material rod in order to manufacture a fixed amount of the optical transmission body. When the diameter exceeds 60 mm, a volume of the molten plastics is increased. Accordingly, the time during which the plastic material is being molten is not shortened, and the plastics which are not excellent in thermal stability may bring about the deterioration of the signal transmission loss due to the degraded matter. In the case where the cross-sectional shape of the material rod is polygonal, the above-described diameter corresponds to a diameter of a circumscribed circle.

Preferably, a cross-sectional area of the inner circumferential surface of the heat melting unit is larger than a cross-sectional area of the material rod. The gas pressurizing surface in this case becomes an annular portion between the outer circumference of the material rod and the outer circumference of the molten plastics. The inner diameter of the heat melting unit is set larger than the outer diameter of the material rod by a predetermined amount. Accordingly, the outer diameter of the molten plastics becomes larger than the outer diameter of the material rod. Hence, the gas pressure is applied to the annular portion of the molten plastics, which is located outside of the outer diameter of the material rod, whereby the molten plastics can be extruded from the discharge port and supplied to the metal die.

When the cross-sectional area of the inner circumferential surface of the heat melting unit is the same as the cross-sectional area of the material rod, the pressurizing surface becomes extremely small, and an extrusion amount becomes extremely small. Then, a gas pressure of 3 MPa or more is required in order to achieve a realistic extrusion amount, and this is not preferable.

A difference between the cross-sectional area of the inner circumferential surface of the heat melting unit and the cross-sectional area of the material rod is preferably 200 to 2000 $mm^2$, more preferably 400 to 1800 $mm^2$. When the difference between the cross-sectional area of the inner circumferential surface of the heat melting unit and the cross-sectional area of the material rod exceeds 2000 $mm^2$, the volume of the molten plastics is increased. Accordingly, the time while the plastic material is being molten is not shortened, and the plastics which are not excellent in thermal stability may bring about the deterioration of the signal transmission loss due to the degraded matter.

The heating means is not particularly limited; however, the hopper may be heated by using an electric heater, or a far infrared heater may be used, or the electric heater and the far infrared heater may be used in combination. A method using induction heating is also mentioned, and particularly, for a plastic material containing chlorine atoms such as polychlorinated styrene, induction heating by a high frequency is effective.

When the far infrared heater or the induction heating is used, the plastic rod material can be easily heated even if a gap between the inner circumferential surface of the heat melting unit and the plastic rod material is large (even if the outer diameter of the material rod is small).

Preferably, a downward fall of the material rod is performed at a controlled speed by melting amount controlling means, whereby a melting amount thereof is controlled. As the melting amount controlling means, a variety of actuators can be used; however, for example, is preferable that adhesion of foreign objects onto the material be prevented by using an actuator for a clean environment.

The melting amount controlling means may include: a main body that has an actuator mechanism built therein and is arranged outside of the container; and a feeding rod that is movably arranged in the container, is driven by the main body, and feeds the rod-like plastic material (material rod) downward, the feeding rod being inserted into the container from an opening edge portion of the container, and sealing means for preventing leakage of pressurized gas from between the container and the feeding rod is provided in the opening edge portion of the container.

That is, in the event of using the actuator, although the actuator may be arranged in the container, more preferably, a drive portion (including a motor) of the actuator is arranged outside of the container, and the feeding rod driven by the actuator is moved in the container, whereby the material rod is fed downward. In this manner, even if abraded dust and the like occur in the drive portion of the actuator, it is easy to prevent the abraded dust and the like from entering the container, and a variety of actuators can be used. The feeding rod is moved up and down while exposing a part thereof to the outside of the container. Accordingly, it is necessary to prevent intrusion of the foreign objects from the opening edge portion of the container and the feeding rod. The sealing means is provided on the opening edge portion of the container, whereby the intrusion of the foreign objects, which are as described above, can be prevented.

Preferably, the sealing means includes: at least one backup ring-added X-ring; a slide bush; and a pair of dust seals which sandwich the backup ring-added X-ring and the slide bush from both sides.

The pressurized gas for moving the molten plastics is filled into the container. Accordingly, in the case of a seal by an O-ring used most generally, it becomes difficult to smoothly move the feeding rod up and down under the pressurization, to prevent the leakage of the pressurized gas in the container, and to also reliably prevent the intrusion of the foreign objects. In this connection, the X-ring is used in place of the O-ring, whereby reduction of abrasion resistance is achieved, and in addition, the feeding rod is guided by using the slide bush, whereby such smooth movement of the feeding rod is ensured. Moreover, for the fact that the slide bush and the X-ring are abraded to generate the dust following the movement of the feeding rod, the dust seals are attached onto upper and lower portions of these sealing members (the slide bush and the X-ring), whereby the dust is sandwiched by the dust seals, release of the abraded dust is suppressed, and the intrusion of the dust into the container is prevented. Accordingly, it becomes possible to use the extrusion material supply device for a usage purpose in which an extremely high degree of cleanness is required.

A support member urged in an axial direction by an elastic member may be movably attached onto the feeding rod, and a holding member that holds an upper end portion of the rod-like plastic material may be provided on the support member.

Specifically, for example, a configuration of such a material rod holding unit includes: a fixed spring receiving ring fixed to the feeding rod; a movable spring receiving ring (support member) movably attached onto the feeding rod below the fixed spring receiving ring; a compression coil spring (elastic member) arranged between both of the spring receiving rings; a pair of holding arms (holding members) which are attached onto the movable spring receiving rings while interposing a coupling plate therebetween, and are urged inward (in an orientation of sandwiching the material rod).

The material rod is held by the holding member, and is fed by the melting amount controlling means in response to the molten plastics in the heat melting unit being discharged. At this time, in the case where the material rod receives reaction force from the molten plastics, and a balance between the melting and the feeding amount is disturbed, a large load may be applied to the actuator. In this case, the holding members urged in the axial direction by the elastic member (for example, the compression coil spring) are moved, whereby this load can be absorbed to some extent, whereby a damage of the actuator can be prevented.

A filling gas amount reduction block in which a through passage serving as a movement space of the feeding rod is formed may be inserted into a pressurizing tank. The filling gas amount reduction block is formed into a substantially cylindrical shape, and in the filling as amount reduction block, predetermined portions are cut away so as not to inhibit the insertion of the material rod into the container. Accordingly, a usage amount of the pressurized gas can be reduced.

Preferably, a receiving pan for preventing a fall of dust from an upper portion of the container is provided on the filling gas amount reduction block. The receiving pan is a pan for preventing the fall of the dust and the foreign objects, and it is difficult to install the receiving pan in the container. However, the filling gas amount reduction block capable of reducing the usage amount of the pressurized gas is used, and the receiving pan is attached thereonto, whereby the receiving pan can be easily installed. The foreign objects falling downward are caught by the receiving pan, whereby the adhesion of the foreign objects onto the plastic material is prevented.

A method for manufacturing an optical transmission body according to the present invention is a method wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the above-described extrusion material supply device as the core material supply device and the cladding material supply device.

A type of the plastics for use in manufacturing the optical transmission body is not limited as long as the plastics has high transparency and can be used for the optical transmission. For example, a polymer of a (meth)acrylic acid ester monomer and a polymer of a styrene monomer are mentioned. As the (meth)acrylic acid ester monomer, there are mentioned methyl methacrylate, ethyl methacrylate, n-propyl methacrylate, n-butyl methacrylate, methyl acrylate, ethyl acrylate, n-propyl acrylate, n-butyl acrylate, and the like. As the styrene monomer, there are mentioned styrene, α-methyl styrene, chlorostyrene, bromostyrene, and the like. Copolymers of these may also be used. As other copolymer components, there are illustrated: vinyl esters such as vinyl acetate, vinyl benzoate, vinyl phenyl acetate, and vinyl chloroacetate; maleimides such as N-n-butyl maleimide, N-tert-butyl maleimide, N-isopropyl maleimide, and N-cyclohexyl maleimide; and the like. Other than the above, polycarbonate plastics, cycloolefin plastics, amorphous fluorine plastics and the like can be used.

The optical fiber is usually classified into a multi-mode optical fiber and a single-mode optical fiber. Moreover, the multi-mode optical fiber is classified into a step-index (SI) type and a graded-index (GI) type having a refractive index distribution. The method for manufacturing the optical transmission body according to the present invention is more advantageous in manufacturing the optical fiber of the GI type (of a type including a core having a distribution in a magnitude of a refractive index from a center toward an outside in a radial direction).

According to the above-described extrusion material supply device, a feeding speed of the material rod is controlled by the melting amount controlling means (for example, the actuator), and a discharge speed is controlled by the gas pressure brought by the gas pressurizing means. In the event of manufacturing the optical transmission body including the core layer and the cladding layer, while the diameter of the optical transmission body is, for example, approximately several 10 μm to 1 mm, it is preferable to use the material rod with a diameter of approximately several 10 mm from a viewpoint of enhancing the quality of the product. In this case, the diameter of the material rod is extremely larger in comparison with a discharge amount of the molten plastics. Accordingly, in order to cope with this matter, it is necessary to slow down the feeding speed of the material rod (for example, 1 mm or less per minute). As a matter of course, an actuator made capable of such ultra-low speed feeding may be used; however, it is difficult for a general actuator to perform such ultra-low speed feeding. Therefore, as the melting amount controlling means, the general actuator (the one in which the feeding speed is approximately 1 mm per minute) is used, and in addition, means for controlling such feeding is configured to perform the feeding of the material rod by a predetermined amount (by an appropriate feeding amount of the actuator) at every elapse of a predetermined time. In this case, preferably, the above-described predetermined time is set at 60 seconds or more (2000 seconds or less), and at every elapse of this time, for example, the feeding of the material rod is performed just for 1 second, and the feeding is stopped for the time other than this 1 second. Preferably, a state of the molten plastics is detected by using a temperature sensor and a pressure sensor, and the above-described predetermined time is appropriately adjusted based on a result of this detection.

Effects of the Invention

According to the present invention, the time during which the plastic material is being heat molten is suppressed to a short time, the degrading foreign objects which cause the deterioration of the optical signal transmission loss are extremely little, and it becomes possible to manufacture the optical fiber with high productivity intrinsic to the extrusion molding method.

Figure 1:
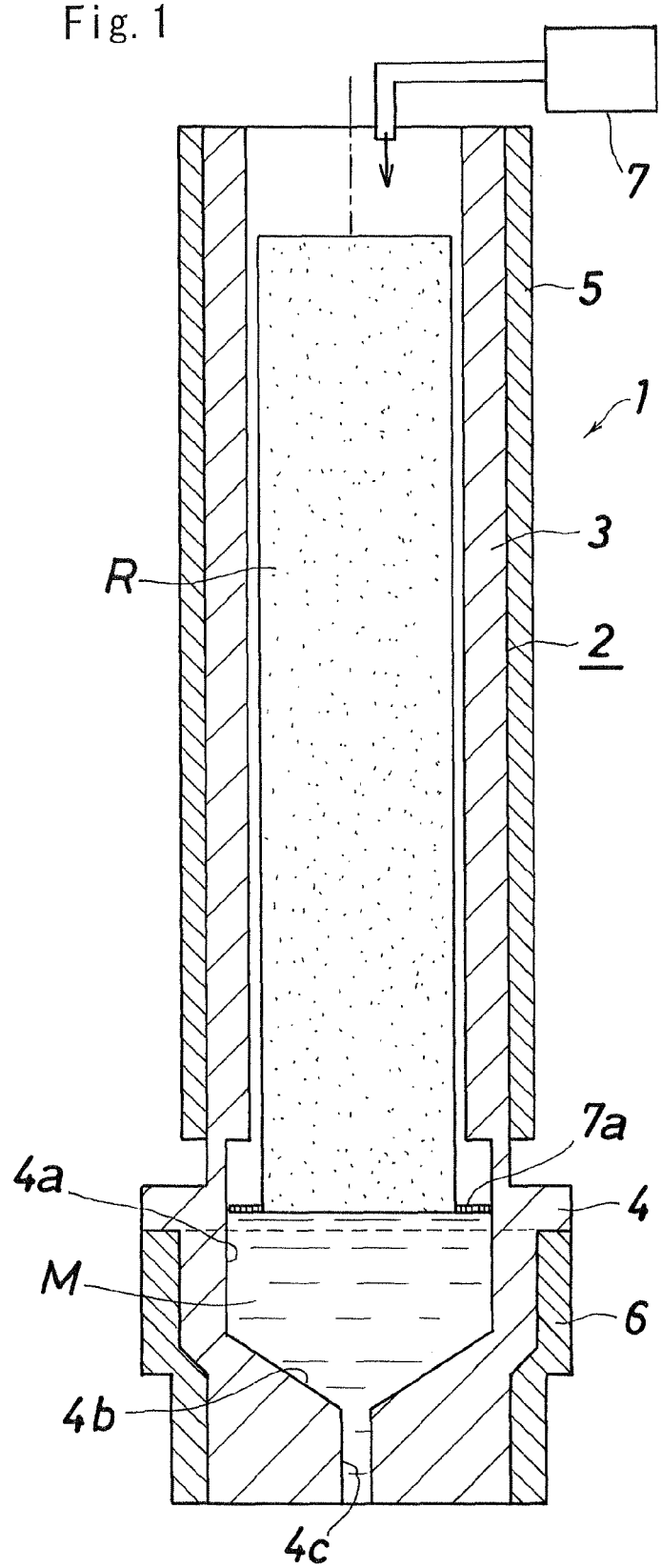
FIG. 1 is a longitudinal cross-sectional view showing a first embodiment of an extrusion material supply device according to the present invention.

DESCRIPTION OF REFERENCE SIGNS (1) extrusion material supply device
(2) hopper (container)
(3) cooling unit
(4) (8) (9) heat melting unit
(5) cooling means
(6) electric heater (heating means)
(7) (16) gas pressurizing means
(10) far infrared heater (heating means)
(13) electric heater (heating means)
(17) actuator (melting amount controlling means)
(20) extrusion apparatus
(21) core material supply device
(22) cladding material supply device
(23) double layer metal die
(41) pressurizing tank (container)
(42) gas pressurizing means
(44) cooling unit
(45) heat melting unit
(51) actuator (melting amount controlling means)
(52) feeding rod
(60) feeding rod sealing means (sealing means)
(61) actuator main body
(64) X-ring
(65) slide bush
(66) dust seal
(67) backup ring
(72) movable spring receiving ring (support member)
(73) compression coil spring (elastic member)
(75) holding arm (holding member)
(81) filling gas amount reduction block
(82) through passage
(83) receiving pan
(R) material rod (rod-like plastic material)

Embodiments of the Invention

A description is made below of embodiments of the present invention with reference to the drawings. In the following description, up and down in the drawings are referred to as "un" and "down".

Figure 13:
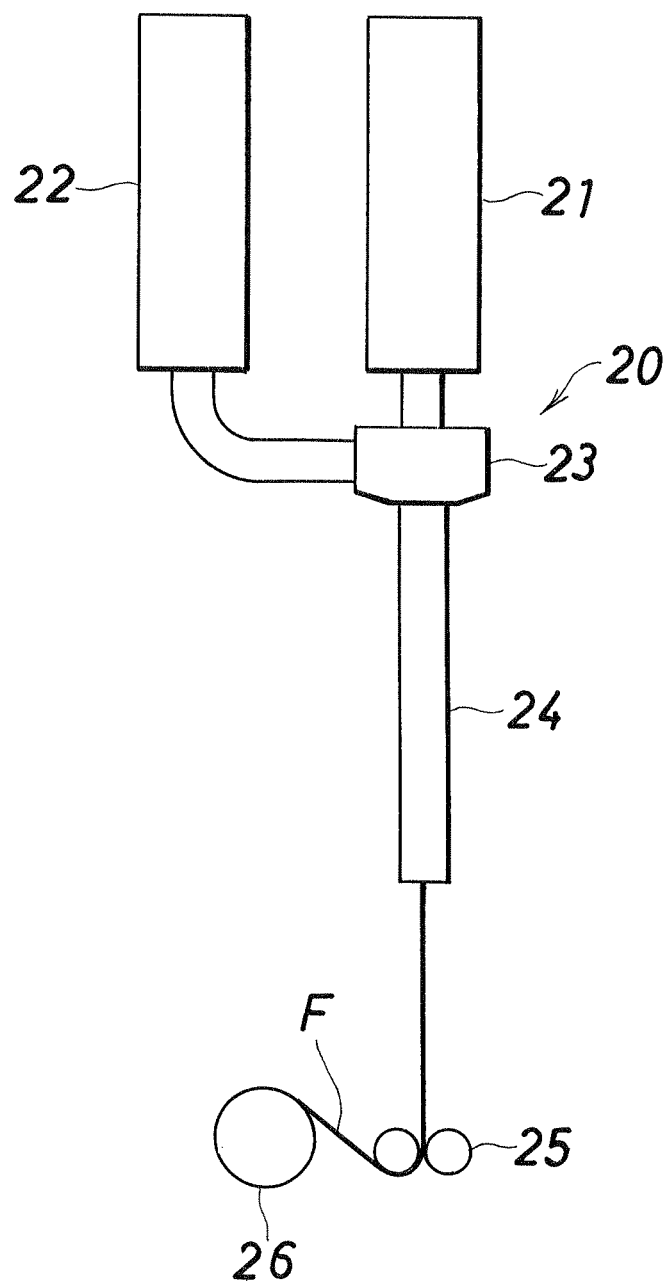
FIG. 13 is a view showing a melt extrusion apparatus as an example for which the extrusion material supply device according to the present invention is used.

FIG. 13 shows a melt extrusion apparatus for manufacturing an optical transmission body, the melt extrusion apparatus being an example in which an extrusion material supply device according to the present invention is used. This apparatus (20) manufactures a plastic optical fiber, which has a refractive index distribution, by a melt extrusion method. In the apparatus (20), a core material supply device (21) and a cladding material supply device (22) are coupled to an upstream side of a double layer metal die (23) for a core layer and a cladding layer. On a downstream side of the double layer metal die (23), a dopant diffusion tube (24) for diffusing dopant (refractive index adjuster) is provided, and on a downstream thereof, a take-up roll (26) is arranged while interposing rolls (25) therebetween.

According to this apparatus (20), first, materials for the core layer and the cladding layer are heated and shifted into a molten state in the respective material supply devices (21) and (22). Subsequently, in the double layer metal die (23), the materials are formed into a double layer structure in which the cladding layer is provided on an outer circumference of the core layer. Subsequently, in the dopant diffusion tube (24), the dopant is diffused, whereby the refractive index distribution is formed in this structure. Subsequently, the structure is processed to a predetermined diameter by the rolls (25). In this manner, a GI-type optical fiber (F) as the plastic optical transmission body is manufactured.

An extrusion material supply device (1) according to the present invention is suitable for the core material supply device (21) and the cladding material supply device (22), and FIG. 1 shows a first embodiment thereof.

As shown in FIG. 1, the extrusion material supply device (1) of the first embodiment includes: a vertical hopper (container) 2, which has a cooling unit (3) and a heat melting unit (4) continuous with a lower portion thereof, and houses a material rod (rod-like plastic material) (R); cooling means (5) for cooling the cooling unit (3); heating means (6) for heating the heat melting unit (4); and gas pressurizing means (7) for sequentially supplying molten plastics (M) to the metal die by a gas pressure.

The cooling unit (3) is formed into a vertically long cylinder shape, and a clearance between an inner circumferential surface of the cooling unit (3) and an outer circumferential surface of the material rod (R) is set small in order to efficiently perform cooling.

The heat melting unit (4) is formed into a cylinder shape in which an inner diameter is larger than an inner diameter of the cooling unit (3) arranged above, and enables the molten plastic material (M) to spread in the heat melting unit (4) (an outer diameter of the molten plastics (M) becomes larger than an outer diameter of the material rod (R)). On an inner circumference of the heat melting unit (4), an inverse conical portion (4b) continuous with a cylinder portion (4a) is provided, and the molten plastics (M) is supplied downstream from a molten plastic discharge port (4c) provided on a lower end portion of the inverse conical portion (4b).

An electric heater is used as the heating means (6), and the heating means (6) is arranged so as to surround the heat melting unit (4). The heating means (6) is arranged so as not to strongly heat an upper end portion of the heat melting unit (4), and so as to heat not only the cylinder portion (4a) but also the inverse conical portion (4b). By such heating by the heating means (6), in the heat melting unit (4), there exist a lower end portion of the plastic material (R) left in the rod shape and the molten plastics (M) obtained by melting the plastic material (R).

The gas pressurizing means (7) supplies gas into the hopper (2). At the upper end portion of the heat melting unit (4), the outer diameter of the molten plastics (M) is larger than the outer diameter of the material rod (R). Accordingly, an annular portion between an outer circumference of the material rod (R) and an outer circumference of the molten plastics (M) becomes a gas pressurizing surface (7a), and an area by which the gas pressure collides with the molten plastics (M) is ensured.

In this embodiment, the heat melting unit (4) is formed into the cylinder shape larger in inner diameter than the cooling unit (3). Accordingly, even if a liquid level of the molten plastics (M) is varied to some extent, the area of the gas pressurizing surface (7a) is not changed, and accordingly, extrusion force by the gas pressure is not changed.

Figure 2:
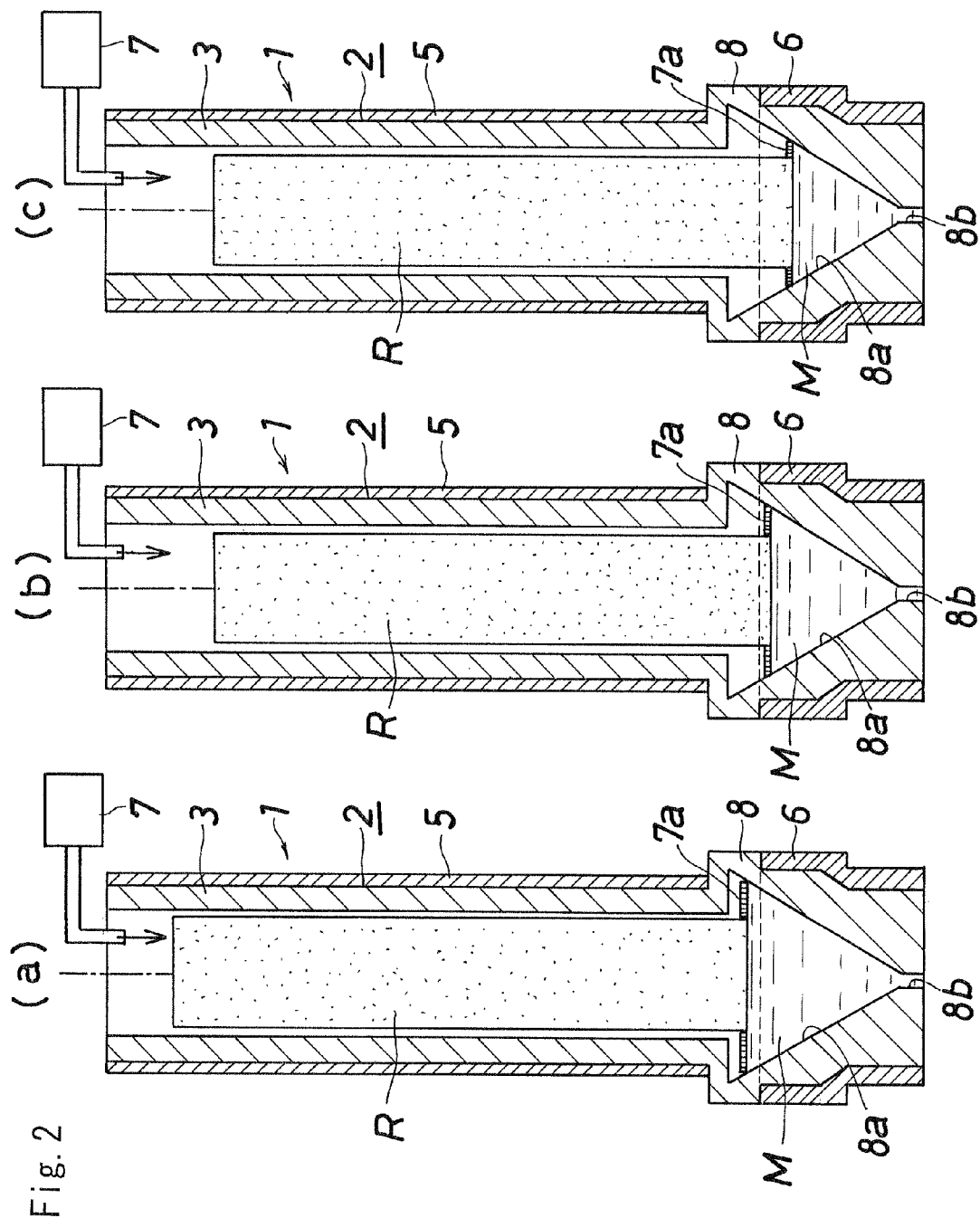
FIGS. 2(a) to 2(c) are longitudinal cross-sectional views showing a second embodiment of the extrusion material supply device according to the present invention.

FIGS. 2(a) to 2(c) show the extrusion material supply device (1) of a second embodiment, and the extrusion material supply device (1) of this embodiment includes: a vertical hopper (2) which includes a cooling unit (3) and a heat melting unit (8) continuous with a lower portion thereof, and houses the material rod (R); the cooling means (5) for cooling the cooling unit (3); the heating means (6) for heating the heat melting unit (8); and the gas pressurizing means (7) for sequentially supplying the molten plastics (M) to the metal die by the gas pressure.

The second embodiment is different from the first embodiment in terms of a shape of the heat melting unit (8) of the hopper (2).

On an inner circumference of the heat melting unit (8) in the second embodiment, an inverse conical inner circumferential surface (8a) in which an outer diameter of an upper end is larger than an inner diameter of the cooling unit (3) arranged above is provided, and enables the molten plastic material (M) to spread in an upper portion of the heat melting unit (8) (an outer diameter of the molten plastics (M) located in the upper portion in the heat melting unit (8) becomes larger than the outer diameter of the material rod (R)). The diameter of the heat melting unit (8) becomes smaller as it goes downward. The molten plastics (M) are supplied downward from a molten plastic discharge port (8b) provided on a lower end portion of the heat melting unit (8).

Similarly to the first embodiment, the electric heater is used as the heating means (6), the heating means (6) is arranged so as to surround the heat melting unit (8), and is configured to heat the entire region of the heat melting unit (8) excluding an upper end portion of the heat melting unit (8). In this manner, in the heat melting unit (8), there exist the lower end portion of the plastic material (R) left in the rod shape and the molten plastics (M) obtained by melting the plastic material (R). By the fact that the outer diameter of the molten plastics (M) is larger than the outer diameter of the material rod (R), the gas pressurizing surface (7a) is formed on the annular portion between the outer circumference of the material rod (R) and the outer circumference of the molten plastics (M), and the area by which the gas pressure collides with the molten plastics (M) is ensured.

In this embodiment, the heat melting unit (8) has the inverse conical inner circumferential surface (8a) in which the outer diameter of the upper end is larger than the inner diameter of the cooling unit (3). Accordingly, such a function and an effect as in "even if a liquid level of the molten plastics (M) is varied, the area of the gas pressurizing surface (7a) is not changed, and accordingly, extrusion force by the gas pressure is not changed", which are obtained in the first embodiment where the cylindrical inner surface (4a) is substituted for the inverse conical inner circumferential surface (8a), are not obtained. However, the area of the gas pressurizing surface (7a) is changed, whereby a flow rate of the plastics is corrected following a temperature change of the metal die on the downstream side.

That is, a state shown in FIG. 2(a) shows the case where the temperature of the metal die drops from a state shown in FIG. 2(b), which is taken as a standard state. In this case, a decrease of the flow rate of the plastics due to the temperature drop of the metal die is automatically corrected by steps of: temperature drop of metal die→increase of viscosity of plastics→decrease of flow rate of plastics→rise of melting surface of plastics→increase of extrusion force (gas pressure×pressurization area)→increase of flow rate of plastics. A state shown in FIG. 2(c) shows the case where the temperature of the metal die rises from the state shown in FIG. 2(b), which is taken as the standard state. In this case, an increase of the flow rate of the plastics due to the temperature rise of the metal die is automatically corrected by steps of: temperature rise of metal die→decrease of viscosity of plastics→increase of flow rate of plastics→drop of melting surface of plastics→decrease of extrusion force (gas pressure×pressurization area)→decrease of flow rate of plastics.

Figure 3:
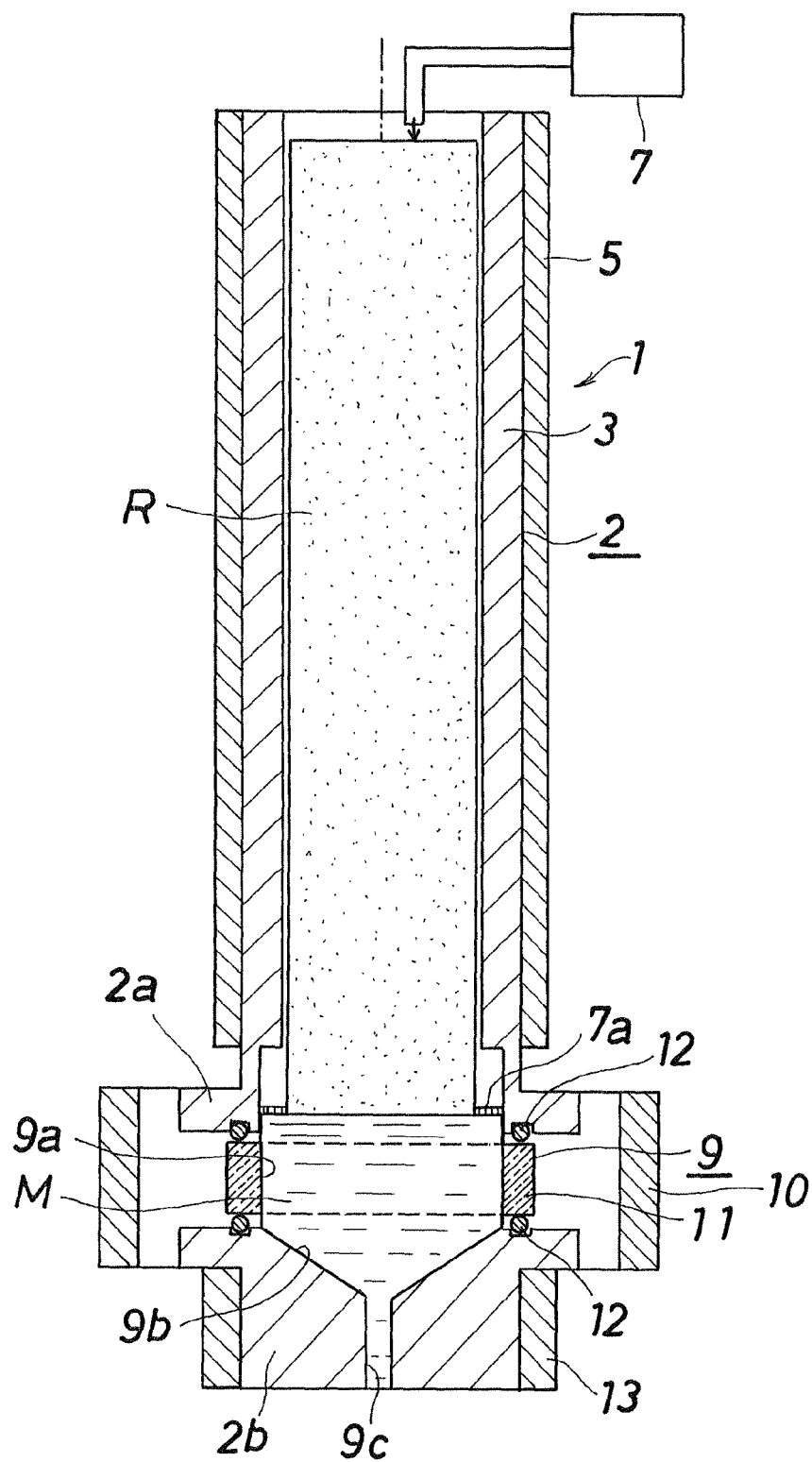
FIG. 3 is a longitudinal cross-sectional view showing a third embodiment of the extrusion material supply device according to the present invention.

FIG. 3 shows an extrusion material supply device (1) of a third embodiment. The extrusion material supply device (1) of this embodiment includes: the vertical hopper (container) 2, which has the cooling unit (3) and a heat melting unit (9) continuous with the lower portion thereof, and houses the material rod (R) therein; the cooling means (5) for cooling the cooling unit (3); heating means (10) and (13) for heating the heat melting unit (9); and the gas pressurizing means (7) for sequentially supplying the molten plastics (M) to the metal die by the gas pressure.

The third embodiment is different from the first embodiment in terms of configurations of the heat melting unit (9) and the heating means (10) and (13).

As the heating means (10) and (13), an electric heater (13) and a far infrared heater (10) are used in combination, and are arranged so as to surround the heat melting unit (9).

Similarly to the first embodiment, on an inner circumference of the heat melting unit (9), an inverse conical portion (9b) continuous with a cylinder portion (9a) is provided, and on a lower end portion of the inverse conical portion (9b), a molten plastic discharge port (9c) is provided. In this manner, even if the liquid level of the molten plastics (M) is varied, the area by which the gas pressure collides therewith is not changed.

Then, in order that an upper end portion of the heat melting unit (9) cannot be heated, the far infrared heater (10) is arranged so as to surround the cylinder portion (9a), and the electric heater (13) is arranged so as to heat the inverse conical portion (9b). In this manner, in the heat melting unit (9), there exist the lower end portion of the plastic material (R) left in the rod shape and the molten plastics (M) obtained by melting the plastic material (R).

A center portion of the heat melting unit (9) is formed of a heat-resistant glass ring (11) as a separate body from the cooling unit (3) of the hopper (2), whereby heating by the far infrared heater (10) is made possible. The heat-resistant glass ring (11) inserted between a flange portion (2a), which is arranged on a boundary portion with the cooling unit (3), and forms the upper end portion of the heat melting unit (9), and a hopper lower end portion (2b), which forms the inverse conical portion (9b) and molten plastic discharge port (9c) of the heat melting unit (9), while interposing O-rings (12) therebetween.

In the third embodiment, the far infrared heater (10) is used for heating the center portion of the heat melting unit (9). Accordingly, even if there is a gap between the material rod (R) and the inner circumference of the heat melting unit (9) (even in the case where the outer diameter of the material rod (R) is small), appropriate heat melting can be performed.

Figure 4:
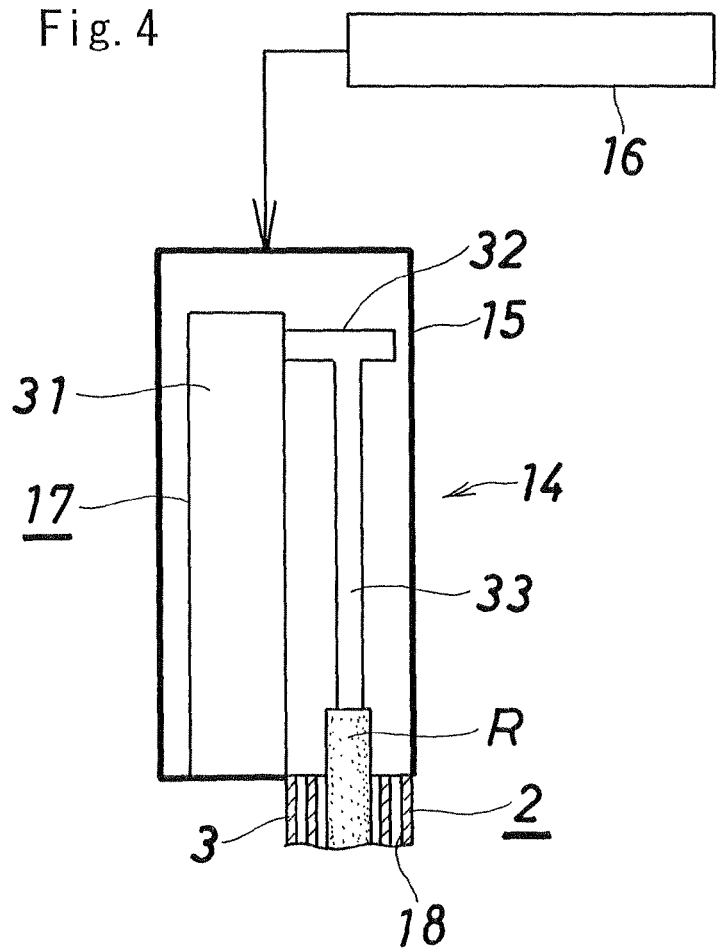
FIG. 4 is a longitudinal cross-sectional view showing a first embodiment of plastic material feeding means for use in the extrusion material supply device according to the present invention.

FIG. 4 shows plastic material feeding means (14) that can be added to the extrusion material supply device (1) in each of the above-described embodiments. In FIG. 4, the plastic material feeding means (14) includes an actuator (melting amount controlling means) (17) arranged in a pressurizing tank (15). In the pressurizing tank (15), a space for housing the actuator (17) is provided so as to continue with the hopper (container of which entirety is formed so as to correspond to the shape of the material rod) (2) holding the material rod (R), and pressurized nitrogen gas of the gas pressurizing means (16) fills an inside of the pressurizing tank (15). In this manner, a portion of the molten plastics, which has spread more than a peripheral edge of the material rod (R), is pressed downward.

The actuator (17) is an actuator having specifications of dust occurrence prevention, for example, an LM actuator for clean environment, which is manufactured by THK Co., Ltd. The actuator (17) includes: a main body (31) that has an actuator mechanism built therein; and a slider (32) that is located outside of the main body (31) and is moved by the actuator mechanism. In the slider (32), a feeding rod (33) that feeds the material rod (R) downward is provided integrally therewith. By this actuator (17), the downward fall of the material rod (R) can be performed at a controlled speed, and the amount of the molten plastics supplied into the double layer metal die (23) can be controlled accurately.

In the case of manufacturing the plastic optical fiber (F) by the melt extrusion method, while a diameter of the plastic optical fiber (F) is approximately several 10 µm to 1 mm, the diameter of the material rod (R) becomes approximately several 10 mm. Accordingly, a feeding speed of the material rod (R) by the actuator (17) becomes extremely slow, and by the actuator (17), the material rod (R) is fed by every predetermined distance (for example, at 1 mm step). Preferably, a time interval at which this feeding is performed is controlled based on a state of the molten plastics (M) in the heat melting unit (4) (for example, in a standard state, the material rod (R) is fed by every 1 mm at an interval of 100 seconds, and this time interval is lengthened and shortened depending on the state of the molten plastics (M)).

Figure 5:
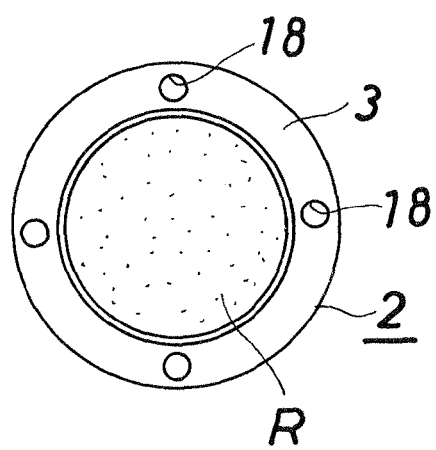
FIGS. 5(a) and 5(b) are lateral cross-sectional views showing another embodiment of a hopper for use in the extrusion material supply device according to the present invention.
Figure 5:
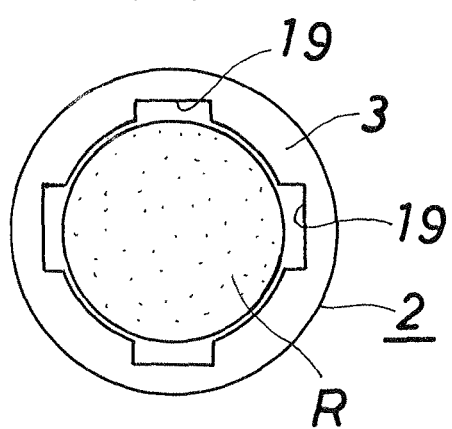

In FIG. 4, in the cooling unit (3) of the hopper (2), ventilation holes (18) for improving passage of the pressurized nitrogen gas are formed so as to penetrate a circumferential wall of the cooling unit (3) in a vertical direction. Accordingly, the ventilation hole (18) is formed so as to communicate with a portion more inside than the inner circumferential surface of each of the heat melting units (4), (8), and (9). As shown in FIG. 5(a), the ventilation holes (18) are formed into a circular shape in cross section, and four ventilation holes (18) are provided at an equal interval in the circumferential direction. The ventilation holes (18) as described above are formed also for those in the embodiments, which are shown from FIG. 1 to FIG. 3. In this manner, even in the case where the clearance between the inner circumferential surface of the cooling unit (3) and the outer circumferential surface of the material rod (R) is set small, the pressurization for the molten plastics (M) present in the insides of the heat melting units (4), (8), and (9) can be reliably performed.

Note that the shape and the number of the ventilation holes (18) are not limited to the illustrated ones, and moreover, it is a matter of course that the same effect is obtained even if ventilation grooves (19) substantially rectangular in cross section, which are open to the inner circumference side of the cooling unit (3), are formed in place of the ventilation holes (18) as shown in FIG. 5(b).

In the above description, with regard to the actuator (17), the entirety thereof is arranged in the pressurizing tank (15), and therefore, the pressurizing tank (15) for housing the main body (31) that has the actuator mechanism built therein is enlarged, and the entire apparatus is upsized. In order to downsize the entire apparatus, preferably, the main body that has the actuator mechanism built therein is arranged outside of the pressurizing tank. However, in this case, it is necessary to advance and retreat the feeding rod, which feeds the material rod (R) downward, under the pressurization, and an object is to ensure a sealing property and a dust prevention property in the pressurizing tank. A description is made below of a preferred embodiment (a fourth embodiment of the extrusion material supply device (1)) in the case of arranging the main body of the actuator on the outside of the pressurizing tank. Note that FIG. 6 shows the entirety of the extrusion material supply, and FIG. 7 to FIG. 12 show respective principal portions thereof.

Figure 6:
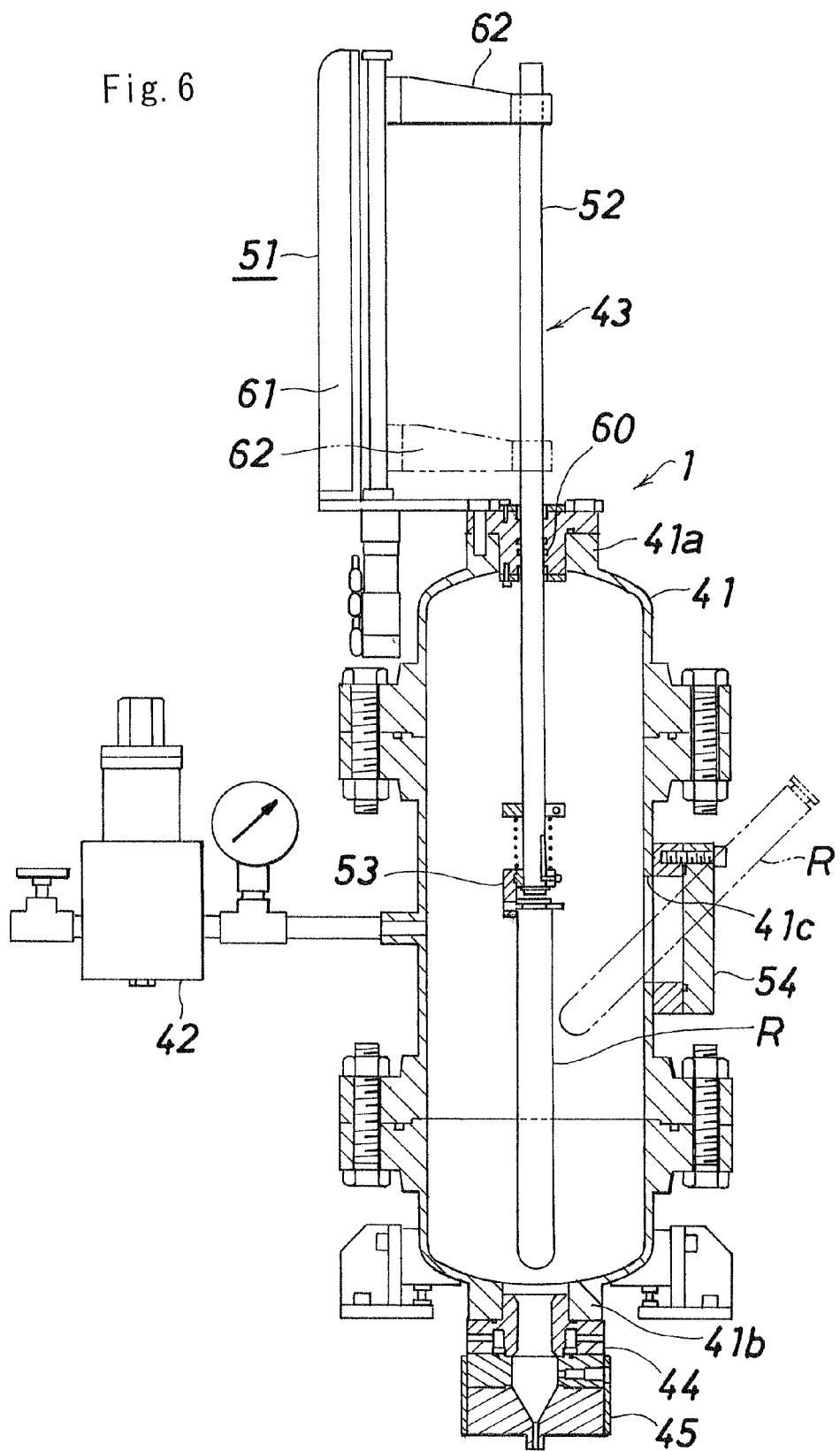
FIG. 6 is a longitudinal cross-sectional view showing a fourth embodiment of the extrusion material supply device according to the present invention.

In FIG. 6, the extrusion material supply device (1) includes: a pressurizing tank (41); gas pressurizing means (42) for introducing the pressurized nitrogen gas into the pressurizing tank (41); and plastic material feeding means (43). A cooling unit (44) and a heat melting unit (45), which correspond to the cooling unit (3) and the heat melting unit (4) in each of the first to third embodiments, respectively, are provided on a lower end of the pressurizing tank (41) continuously therewith.

The plastic material feeding means (43) includes: an actuator (melting amount controlling means) (51); a feeding rod (52) moved up and down by the actuator (51); and a material rod holding unit (53) provided on a lower end portion of the feeding rod (52).

The pressurizing tank (41) has opening portions in upper and lower portions thereof, and on the opening portions, connection portions (41a) and (41b) on which female screws are formed are provided. In the pressurizing tank (41), a rod inlet port (41c) is provided at approximately a midpoint in the vertical direction. In the pressurizing tank (41), a lower portion thereof is defined as a housing space of the material rod (R), and on the rod inlet port (41c), a door (54) capable of hermetically sealing the same is provided. A diameter of the pressurizing tank (41) is set larger than the diameter of the hopper (2) in each of the first to third embodiments.

In the upper opening portion of the pressurizing tank (41), feeding rod sealing means (60) for preventing leakage of the pressurized gas from between the pressurizing tank (41) and the feeding rod (52) is provided.

The actuator (51) includes: a main body (61) that has the actuator mechanism built therein; and a slider (62) that is arranged outside of the main body (61) and is moved by the actuator mechanism, and with regard to the feeding rod (52), an upper end portion thereof is held by the slider (62). The main body (61) and the slider (62) are arranged outside of the pressurizing tank (41), and the feeding rod (52) is inserted into the pressurizing tank (41) from the opening portion in the upper end of the pressurizing tank (41), and is made movable up and down in the pressurizing tank (41). The slider (62) is made movable from a solid line position to a chain double-dashed line position shown in FIG. 6, and a configuration is made so that the material rod (R) can be sequentially inserted from a lower end side thereof into the heat melting unit (45) as the slider (62) is going down.

In the main body (61) of the actuator (51), means for controlling the movement of the slider (62) is built, and by this actuator (51), the downward fall of the material rod (R) can be performed at a controlled speed, and the amount of the molten plastics supplied into the double layer metal die (23) can be controlled accurately.

Figure 7:
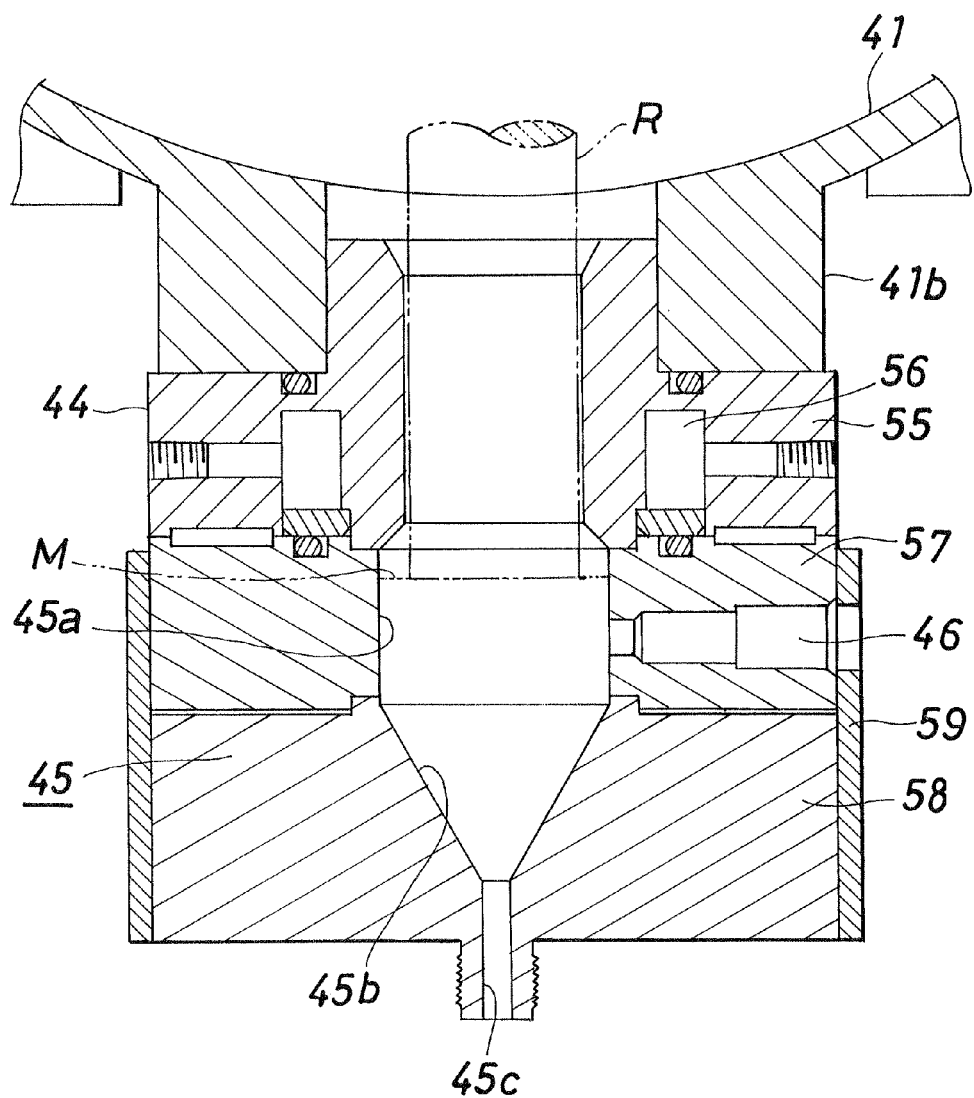
FIG. 7 is a longitudinal cross-sectional view showing a heat melting unit of the fourth embodiment of the extrusion material supply device according to the present invention.

As shown in FIG. 7, onto the connection portion (41b) on the lower end of the pressurizing tank (41), a cooling unit forming cylinder (55) is attached, in an inside of which a coolant passage (56) as cooling means is formed. Moreover, onto a lower surface side of the cooling unit forming cylinder (55), a heat melting unit upper portion forming cylinder (57) is attached. Furthermore, onto a lower surface side of the heat melting unit upper portion forming cylinder (57), a heat melting unit lower portion forming cylinder (58) is attached. Then, a band heater (59) as heating means is attached so as to surround both of the heat melting unit upper portion forming cylinder (57) and the heat melting unit lower portion forming cylinder (58). In this manner, the cooling unit (44) is formed immediately under the pressurizing tank (41), and similarly to the first embodiment, under the cooling unit (44), the heat melting unit (45) is formed, which includes: a cylinder portion (45a); an inverse conical portion (45b) continuous with the cylinder portion (45a); and a molten plastic discharge port (45c) provided on a lower end portion of the inverse conical portion (45b).

Onto the heat melting unit cylinder portion forming cylinder (57), a sensor device (46) is attached, which includes pressure and temperature sensors for detecting the molten state of the plastics. A pressure and a temperature of the molten plastics (M), which are obtained by the sensor device (46), are sent to the means for controlling the movement of the slider (62) of the actuator (51), and a time interval at which the slider (62) is moved, that is, the time interval at which the material rod (R) is fed is appropriately adjusted in response to these values.

Figure 8:
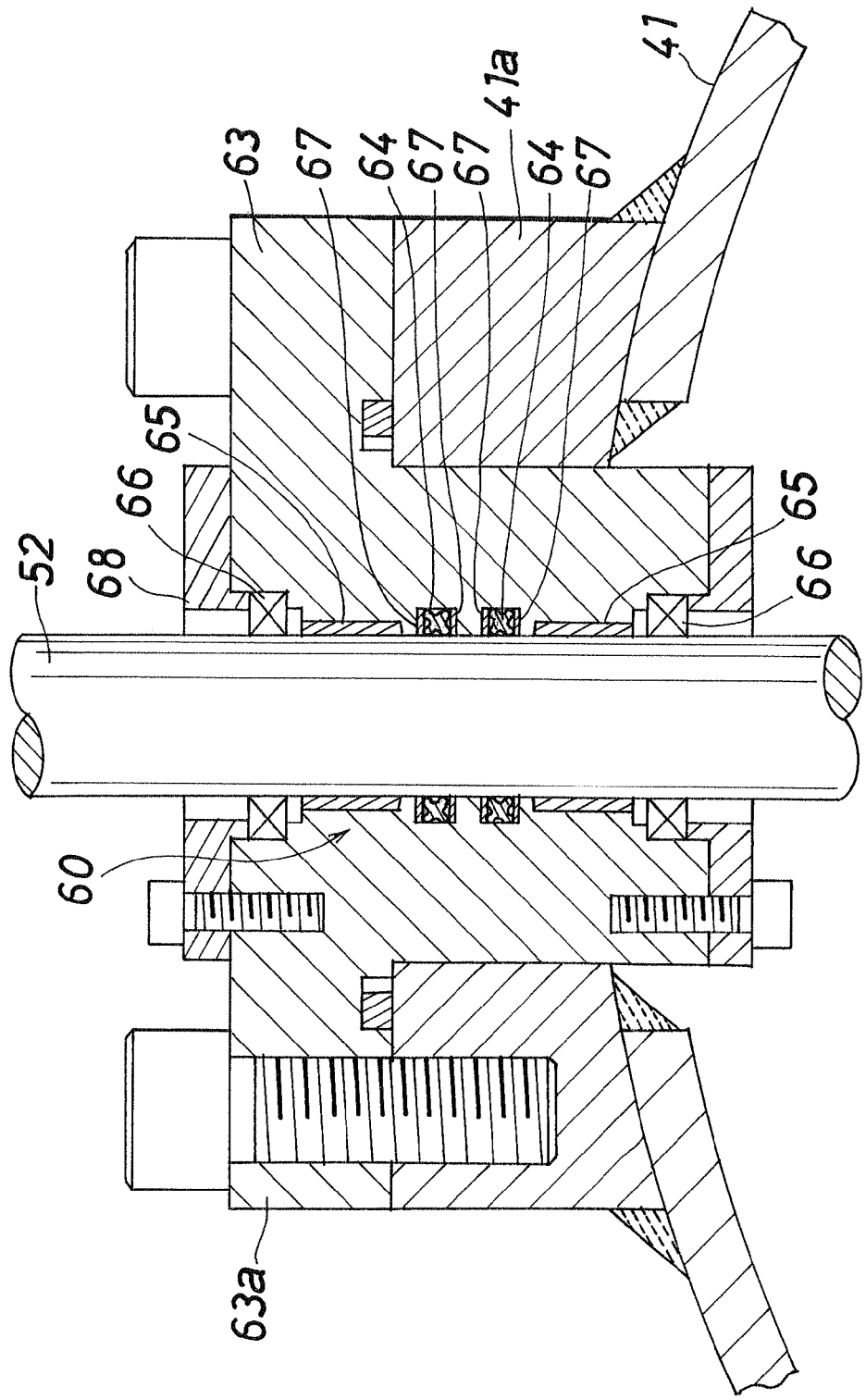
FIG. 8 is a longitudinal cross-sectional view showing sealing means of the fourth embodiment of the extrusion material supply device according to the present invention.

As shown in FIG. 8, feeding rod sealing means (60) includes: a cylindrical seal holding member (63) that is attached onto the upper end portion of the pressurizing tank (41) and allows insertion of the feeding rod (52) so that the feeding rod (52) can be movable up and down; a pair of X-rings (64); a pair of slide bushes (65) arranged so as to sandwich the pair of X-rings (64) from both upper and lower sides thereof; a pair of dust seals (66) arranged so as to sandwich the pair of X-rings (64) and the pair of slide bushes (65) from both upper and lower sides thereof; and a seal stopper (68) that prevents drop-off of the dust seal (66) located uppermost.

The X-rings (64) are made of nitrile rubber, and in addition, are added with PTFE backup rings (67). The backup rings (67) are provided on both of upper and lower sides of each of the X-rings (64). The slide bushes (65) are made of metal, and the dust seals (66) are made of PTFE.

On an inner circumference of the seal holding member (63), there are provided annular grooves for fitting thereinto the respective backup ring (67)-added X-rings (64), the slide bushes (65), and the respective dust seals (66). A flange portion (63a) is provided in the seal holding member (63), and the seal holding member (63) is attached onto the connection portion (41a) of the pressurizing tank (41) by bolts while interposing this flange portion (63a) therebetween.

According to the above-described feeding rod sealing means (60), by the backup ring (67)-added X-rings (64), sealing property is maintained. Moreover, since only tip end portions of the X-rings (64) are brought into contact with the feeding rod (52), a contact surface can be reduced, and the occurrence of the dust can be suppressed. Furthermore, the dust caused by the dust seals (66) is sandwiched, whereby release of such abraded dust is suppressed, and intrusion of the dust into the pressurizing tank (41) is prevented. Moreover, by the backup rings (67), the X-rings (64) are prevented from being jammed into the feeding rod (52) when the feeding rod (52) moves.

Figure 9:
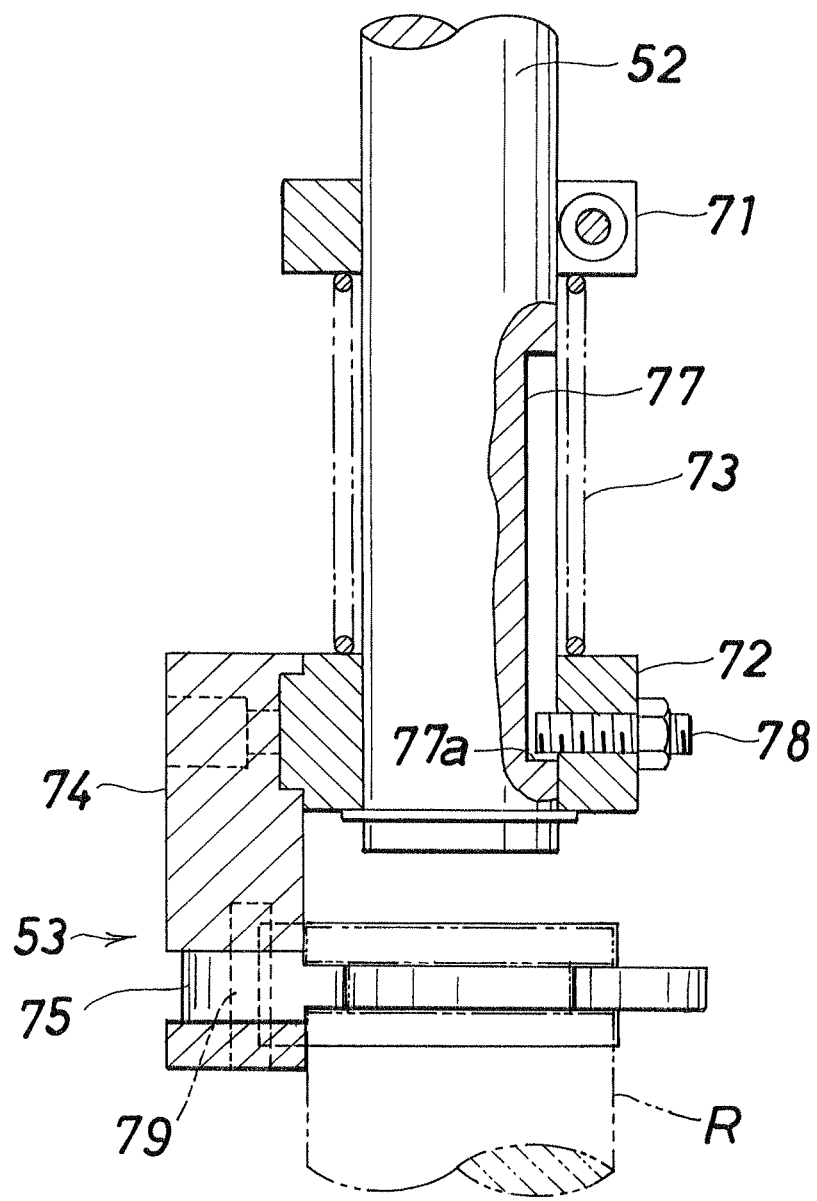
FIG. 9 is a longitudinal cross-sectional view showing a material rod holding unit of the fourth embodiment of the extrusion material supply device according to the present invention.
Figure 10:
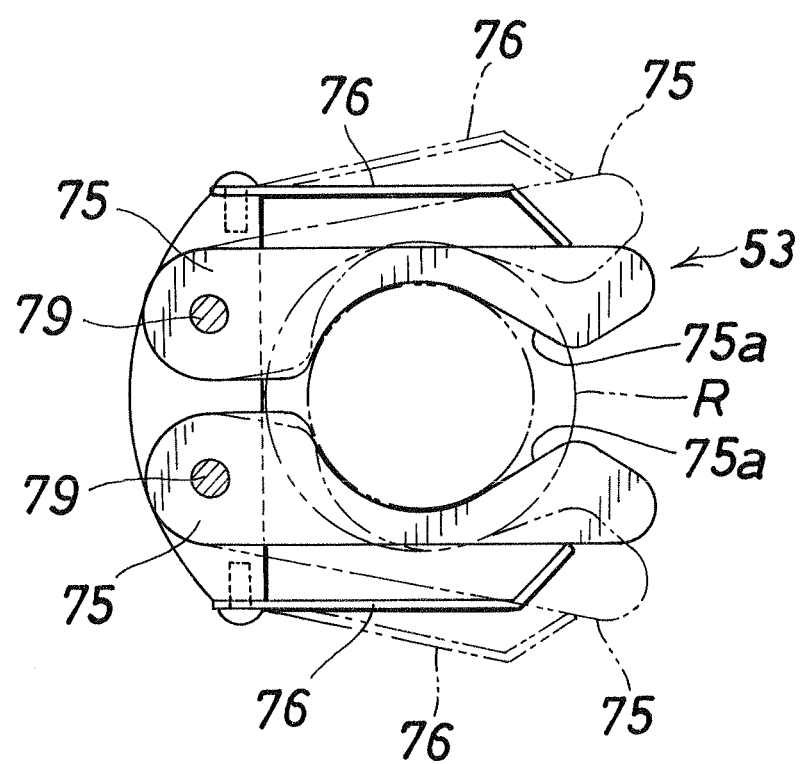
FIG. 10 is a lateral cross-sectional view showing the material rod holding unit of the fourth embodiment of the extrusion material supply device according to the present invention.

As shown in FIG. 9 and FIG. 10, the material rod holding unit (53) includes: a fixed spring receiving ring (71) fixed to the feeding rod (52); a movable spring receiving ring (support member) (72) movably attached onto the feeding rod (52) below the fixed spring receiving ring (71); a compression coil spring (elastic member) (73) arranged between both of the spring receiving rings (71) and (72); a pair of holding arms (holding members) (75) attached onto the movable spring receiving rings (72) while interposing a coupling plate (74) therebetween; and a pair of plate springs (76) which urge the respective holding arms (75) inward (in an orientation of sandwiching the material rod (R)).

On the feeding rod (52), a guide groove (77) extending in an axial direction is formed, and a tip end portion of a screw shaft (78) that penetrates the movable spring receiving ring (72) in a radial direction is fitted into the guide groove (77). The guide groove (77) has a lower surface (77a) that catches the tip end portion of the screw shaft (78), the screw shaft (78) is caught by the lower surface (77a) of the guide groove (77) by the fact that the movable spring receiving ring (72) is urged downward by the compression coil spring (73), and the movable spring receiving ring (72) is made movable upward from this position in the event of receiving upward force.

The respective holding arms (75) are made swingable about a support shaft (79) extending in the vertical direction. In a state of being urged by the plate spring (76), the pair of holding arms (75) form a material rod inserting opening portions between tip end portions thereof, and form a holding portion, which sandwiches the material rod (R), on intermediate portions thereof. On an upper end portion of the material rod (R), an annular groove is provided. The material rod inserting opening portions formed on the respective holding arms (75) are formed slightly smaller in diameter than the annular groove of the material rod (R), and are configured to forcibly insert the material rod (R) between the holding arms (75) while enlarging the opening against the plate springs (76). Holding surfaces (75a) of the respective holding arms (75), which hold the material rod (R), are formed into circular-arc recessed surfaces so as to correspond to the material rod (R) circular in cross section. The material rod (R) is inserted between the holding arms (75), whereby the material rod (R) is positioned accurately, and is sandwiched between the pair of holding arms (75).

In the event of such a feeding operation for the material rod (R) by the actuator (51), in the case where large upward force is applied to the material rod (R), and is directly transmitted to the actuator (51), then there is a possibility that the actuator (51) may be broken, or that feeding accuracy by the actuator (51) may be decreased. Meanwhile, according to the above-described material rod holding unit (53), in the case where the large upward force is applied to the material rod (R), first, the holding arms (75) receive this force. The holding arms (75) are connected to the movable spring receiving ring (72) while interposing the coupling plate (74) therebetween. Accordingly, the upward force is transmitted to the fixed spring receiving ring (71) through the compression coil spring (73), and a load transmitted to the actuator (51) through the feeding rod (52) is reduced.

Figure 11:
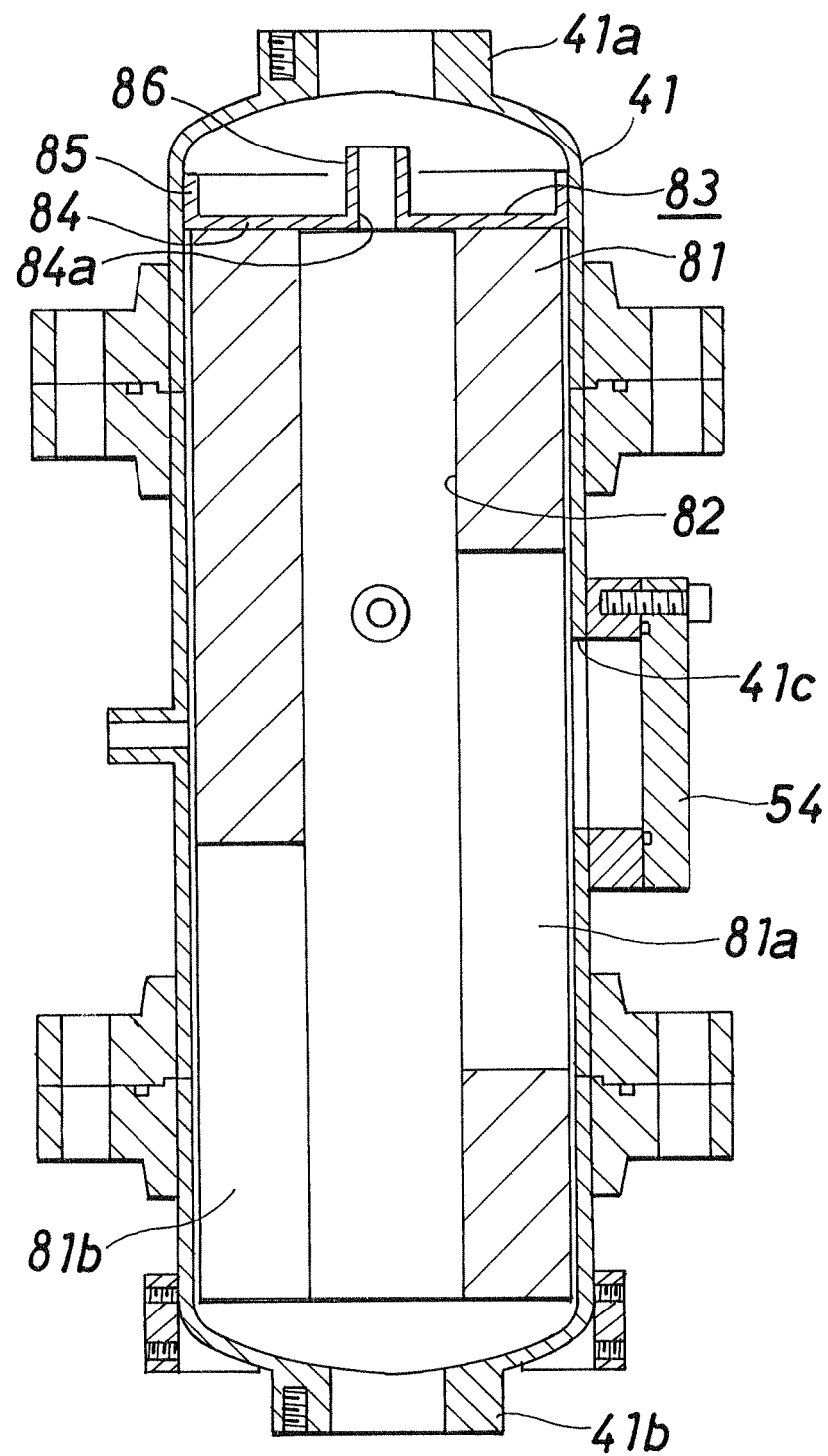
FIG. 11 is a longitudinal cross-sectional view showing a filling gas amount reduction block and a receiving pan of the fourth embodiment of the extrusion material supply device according to the present invention.
Figure 12:
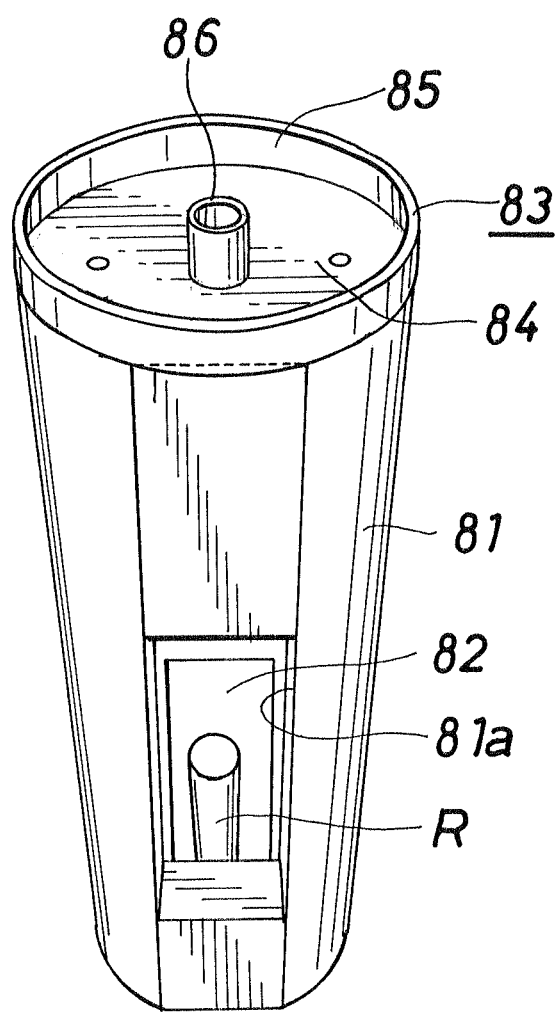
FIG. 12 is a perspective view showing the filling gas amount reduction block and the receiving pan of the fourth embodiment of the extrusion material supply device according to the present invention.

The pressurized nitrogen gas is gas for feeding the molten plastics (M) downward, and for this purpose, it is not necessary to increase the capacity of the pressurizing tank (41). Accordingly, it is preferable that a filling amount of the pressurized nitrogen gas be reduced by reducing the capacity of the pressurizing tank (41). Meanwhile, a movement space of the feeding rod (52) is necessary, and moreover, a space of performing work for holding the material rod (R) in the material rod holding unit (53) is also necessary. In order to strike a balance between these, as shown in FIG. 11 and FIG. 12 (not shown in FIG. 6), a filling gas amount reduction block (81), in which a through passage (82) serving as the movement space of the feeding rod (52) is formed, is inserted into the pressurizing tank (41). In the filling gas amount reduction block (81), an outer circumference thereof is substantially circular in cross section, and is formed slightly smaller than the inner circumference of the pressurizing tank (41), an inner circumference thereof is square in cross section, and an inner diameter thereof, that is, a width of the through passage (82) is set at approximately 2.5 times the diameter of the material rod (R) (approximately 4 times the feeding rod (52)). The entirety of the filling gas amount reduction block (81) forms a cylinder shape; however, a portion (81a) thereof serving as the inlet portion of the material rod (R) is cut away. Moreover, in the case of obliquely inserting the material rod (R), a portion (81b) of the filling gas amount reduction block (81) is also cut away, which is located in a lower portion on a depth side (a left side in FIG. 11) of the pressurizing tank (41), and with which the tip end portion of the material rod (R) is prone to interfere. By using this filling gas amount reduction block (81), the pressurized gas for use can be reduced (in the illustrated example, it is possible to reduce the pressurized gas from 39 liters to 19 liters that is equal to or less than a half of 39 liters). Although not shown, the filling gas amount reduction block (81) is fixed to the pressurizing tank (41) in such a manner that a wedge is driven into a gap formed between both of the pressurizing tank (41) and the filling gas amount reduction block (81).

Between an upper surface of the filling gas amount reduction block (81) and a top wall of the pressurizing tank (41), a space for installing a receiving pan is provided, and a receiving pan (83) for preventing a fall of the dust and the foreign objects is provided by using the filling gas amount reduction block (81).

The receiving pan (83) includes: a bottom wall (84) in which a circular hole (84a) formed to a size just corresponding to the feeding rod (52) inserted therethrough; and a peripheral wall (85) in which an outer circumferential surface is formed into a shape just fitted into the pressurizing tank (41). On an edge portion of the circular hole (84a) of the bottom wall (84), a cylindrical protruding portion (86) is provided, which guides the feeding rod (52) and makes the dust and the foreign objects less likely to adhere to the feeding rod (52).

According to this receiving pan (83), the foreign objects which fall downward in the pressurizing tank (41) are caught on the receiving pan (83), and the foreign objects are prevented from adhering to the material rod (R). Hence, in a state where the intrusion of the dust into the pressurizing tank (41) is prevented by the feeding rod sealing means (60), the dust is further prevented from entering the material rod (R) side also by the receiving pan (83). Accordingly, the intrusion of the foreign objects into the plastic optical fiber (optical transmission body) (F) as a product is prevented, and the deterioration of the signal transmission loss of the plastic optical fiber (optical transmission body) (F) due to the impurities is suppressed.

Example 1

A GI-type optical fiber was fabricated by using a melt extrusion dopant diffusion method using a melt extrusion apparatus (20) shown in FIG. 13.

Methyl methacrylate was evaporated and filtered in advance, and thereafter, was mixed with diphenyl sulfide as a dopant in a ratio of 90:10 in terms of a weight ratio. An obtained mixture was polymerized in a polymerization container, and a material rod for a core, having a diameter of 38 mm and a weight of 200 g, was fabricated. Moreover, methyl methacrylate was evaporated and filtered, and thereafter, was polymerized in the polymerization container, and a material rod for a cladding, having a diameter of 38 mm and a weight of 200 g, was fabricated.

These material rods as plastic materials for the core and the cladding were put into the material supply device (1) with the structure of FIG. 1, in which a difference between a cross-sectional area of the inner circumferential surface of the heat melting unit (cylinder portion (4a)) and a cross-sectional area of the material rod (R) was 990 mm². While setting a nitrogen gas pressure at 1 MPa, and by using the actuator (17) for the clean environment, the downward fall of the plastic material was performed at a controlled speed. After the extrusion was stabilized, the GI-type optical fiber (POF) with a length of 3600 mm was manufactured while spending 6 hours. Transmission losses of both of first and last optical fibers with a length of 50 m were 270 dB/km, and there was no difference therebetween.

Example 2

The material supply device (1) with the structure of FIG. 1 was used, in which the difference between the cross-sectional area of the inner circumferential surface of the heat melting unit (cylinder portion (4a)) and the cross-sectional area of the material rod (R) was 528 mm². In addition, the nitrogen gas pressure was set at 1.9 MPa. Except for the above, in a manner similar to Example 1, an optical fiber with a length of 3600 m was manufactured while spending 6 hours. Transmission losses of both of first and last optical fibers with a length of 50 m were 270 dB/km, and there was no difference therebetween.

Example 3

The material supply device (1) with the structure of FIGS. 2(a) to 2(c) was used, in which a difference between a cross-sectional area of a top portion of the inverse conical inner circumferential surface (8a) of the heat melting unit (8) and a cross-sectional area of the material rod (R) was 0 to 1693 mm$^2$. Except for the above, in a manner similar to Example 1, an optical fiber with a length of 3600 m was manufactured while spending 6 hours. Transmission losses of both of first and last optical fibers with a length of 50 m were 270 dB/km, and there was no difference therebetween.

Example 4

The material supply device (1) with the structure of FIG. 3 was used, in which a difference between a cross-sectional area of the inner circumferential surface of the heat melting unit (cylinder portion (9a)) and a cross-sectional area of the material rod (R) was 1693 mm$^2$. In addition, the nitrogen gas pressure was set at 0.6 MPa. Except for the above, in a manner similar to Example 1, an optical fiber with a length of 3600 m was manufactured while spending 6 hours. Transmission losses of both of first and last optical fibers with a length of 50 m were 270 dB/km, and there was no difference therebetween.

Example 5

In a manner similar to Example 1, a material rod for the core, having a diameter of 38 mm and a weight of 200 g, was fabricated. In addition, a material rod for the cladding, having a diameter of 38 mm and a weight of 200 g, was fabricated.

These material rods as plastic materials for the core and the cladding were put into the material supply device (1) with the structure of FIG. 6, in which a difference between a cross-sectional area of the inner circumferential surface of the heat melting unit (cylinder portion (45a)) and a cross-sectional area of the material rod (R) was 990 mm$^2$, the material supply device (1) including the heat melting unit, the sealing means, the material rod holding unit, the filling gas amount reduction block, and the receiving pan in FIG. 7 to FIG. 12. Then, while setting the nitrogen gas pressure at 1 MPa, and by using the actuator (51), the downward fall of the plastic material was performed at a controlled speed. After the extrusion was stabilized, the GI-type optical fiber (POF) with a length of 3600 mm was manufactured while spending 6 hours. Transmission losses of both of first and last optical fibers with a length of 50 m were 270 dB/km, and there was no difference therebetween.

Comparative Example 1

A material supply device was used, which supplies the material by a gas pressure in a state where the entirety of the material rod was molten by heating the entirety of the hopper. Except for the above, in a manner similar to Example 1, an optical fiber was subjected to extrusion molding. However, after an elapse of 2 hours and 30 minutes after the start of the extrusion, a thread breakage was caused due to an occurrence of voids, and only an optical fiber with a length of 1250 m was able to be manufactured. A transmission loss of a last optical fiber with a length of 50 m was 1500 db/km.

According to the Examples 1 to 5, in comparison with Comparative Example 1 in which the entirety of the material rod is molten, it is understood that the time while the plastic material is being heat molten is suppressed to a short time, that the degrading foreign objects which cause the deterioration of the optical signal transmission loss are extremely small, and that the optical fiber can be manufactured with high productivity intrinsic to the extrusion molding method.

INDUSTRIAL APPLICABILITY

According to the present invention, the optical transmission body (for example, the optical fiber) in which the deterioration of the optical signal transmission loss is small can be manufactured. Accordingly, the present invention can contribute to the enhancement of the manufacturing technique for the optical transmission body.

The invention claimed is:

1. An extrusion material supply device that heat melts a rod-like plastic material and supplies the rod-like plastic material to a metal die, the extrusion material supply device comprising:
a container in which the rod-like plastic material is housed;
a heat melting unit that is provided on a downstream side of the container and heat melts a lower end portion of the rod-like plastic material;
heating means for heating the heat melting unit; and
gas pressurizing means for sequentially supplying molten plastics to the metal die by a gas pressure,
wherein a cross-sectional area of an inner circumferential surface of the heat melting unit is larger than a cross sectional area of an inner circumferential surface of an upstream side of the container,
and a difference between the cross-sectional area of the inner circumferential surface of the heat melting unit and the cross-sectional area of the rod-like plastic material is 200 to 2000 mm$^2$.

2. The extrusion material supply device according to claim 1, wherein the heating means is an electric heater and/or a far infrared heater.

3. The extrusion material supply device according to claim 1, wherein cooling means for cooling the rod-like plastic material is provided on an upstream side of the heat melting unit.

4. The extrusion material supply device according to claim 1, further comprising:
melting amount controlling means for controlling a melting amount of the rod-like plastic material by performing a downward fall of the rod-like plastic material at a controlled speed.

5. The extrusion material supply device according to claim 4, wherein
the melting amount controlling means includes:
a main body that has an actuator mechanism built therein and is arranged outside of the container; and
a feeding rod that is movably arranged in the container, is driven by the main body, and feeds the rod-like plastic material downward, the feeding rod being inserted into the container from an opening edge portion of the container, and
sealing means for preventing leakage of pressurized gas from between the container and the feeding rod is provided in the opening edge portion of the container.

6. The extrusion material supply device according to claim 5, wherein
the sealing means includes:
at least one backup ring-added X-ring;
a slide bush; and
a pair of dust seals which sandwich the backup ring-added X-ring and the slide bush from both sides.

7. The extrusion material supply device according to claim 5, wherein a support member urged in an axial direction by an elastic member is movably attached onto the feeding rod, and a holding member that holds an upper end portion of the rod-like plastic material is provided on the support member.

8. The extrusion material supply device according to claim 5, wherein a filling gas amount reduction block in which a through passage serving as a movement space of the feeding rod is formed is inserted into a pressurizing tank.

9. The extrusion material supply device according to claim 8, wherein a receiving pan for preventing a fall of dust from an upper portion of the container is provided on the filling gas amount reduction block.

10. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 1 as the core material supply device and the cladding material supply device.

11. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 2 as the core material supply device and the cladding material supply device.

12. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 3 as the core material supply device and the cladding material supply device.

13. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 4 as the core material supply device and the cladding material supply device.

14. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 5 as the core material supply device and the cladding material supply device.

15. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 6 as the core material supply device and the cladding material supply device.

16. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 7 as the core material supply device and the cladding material supply device.

17. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 8 as the core material supply device and the cladding material supply device.

18. A method for manufacturing an optical transmission body, wherein a melt extrusion apparatus is used, the melt extrusion apparatus arranging a core material supply device and a cladding material supply device on an upstream side of a double layer metal die for a core layer and a cladding layer, and forming, in the double layer metal die, an optical transmission body including the core layer and the cladding layer, and the optical transmission body is manufactured by using the extrusion material supply device according to claim 9 as the core material supply device and the cladding material supply device.

* * * * *